March 17, 1970   E. V. LEWIS ET AL   3,500,734
PHOTOGRAPHIC RECORDER AND PROCESSOR Filed Oct. 4, 1967   8 Sheets-Sheet 2

Fig. 2.

INVENTORS.
EDWARD V. LEWIS
ROBERT B. TROUSDALE
BY

ATTORNEY.

INVENTORS.
EDWARD V. LEWIS
ROBERT B. TROUSDALE
BY

ATTORNEY.

INVENTORS.
EDWARD V. LEWIS
ROBERT B. TROUSDALE
ATTORNEY.

March 17, 1970 E. V. LEWIS ET AL 3,500,734
PHOTOGRAPHIC RECORDER AND PROCESSOR
Filed Oct. 4, 1967 8 Sheets-Sheet 5

Fig. 7.

INVENTORS.
EDWARD V. LEWIS
ROBERT B. TROUSDALE
BY
ATTORNEY.

March 17, 1970     E. V. LEWIS ET AL     3,500,734

PHOTOGRAPHIC RECORDER AND PROCESSOR

Filed Oct. 4, 1967     8 Sheets-Sheet 6

INVENTORS.
EDWARD V. LEWIS
ROBERT B. TROUSDALE
BY
John A. Duffy
ATTORNEY.

March 17, 1970 E. V. LEWIS ET AL 3,500,734
PHOTOGRAPHIC RECORDER AND PROCESSOR
Filed Oct. 4, 1967 8 Sheets-Sheet 3

Fig. 11.

INVENTORS.
EDWARD V. LEWIS
ROBERT B. TROUSDALE
BY
ATTORNEY.

United States Patent Office 3,500,734
Patented Mar. 17, 1970

3,500,734
PHOTOGRAPHIC RECORDER AND PROCESSOR
Edward V. Lewis, Newport Beach, and Robert B. Trousdale, Santa Ana, Calif., assignors to California Computer Products, Inc., Anaheim, Calif., a corporation of California
Filed Oct. 4, 1967, Ser. No. 672,845
Int. Cl. G03b 17/50, 27/60
U.S. Cl. 95—14      25 Claims

ABSTRACT OF THE DISCLOSURE

High speed oscillograph paper may be utilized to produce permanent records of visually displayed data. The oscillograph paper may be stored on a magazine reel which can be rotated to supply paper according to the rate at which frames or visual information are presented. The functions of exposure and processing may be carried out at speeds independent of one another if the exposed frames are severed from the unexposed stock. After separation, vacuum and springband conveyors may be utilized to transport the exposed frames through the various processing steps of developing, stabilizing, drying and trimming, which are required to produce permanent copies.

Background

This invention relates generally to the engenderment of permanent copies of visual information, and more particularly to high speed asynchronous photographic reproduction of visually displayed data.

Industrial demands have given rise to numerous techniques for making permanent full size reproductions (otherwise known as hard copies) of visual information. Where the data to be copied does not exist in a form which may be readily reproduced using a printing technique or some other contact process, as is the case, for example, with a composite display on a cathode ray oscillograph screen, an optical reproduction method may be employed. In practice this may be either an electrostatic or photographic technique, each having certain advantages, depending upon the particular application. Where, however, fidelity and resolution are of paramount importance, or where it is required to reproduce faint images, the phtographic method is uniformly employed. That the photographic method is superior in such cases may be evidenced by an examination of the processes involved. The electrostatic reproduction technique requires high intensity illumination in order to produce the level of photoconductivity required to distribute a deposited charge in a light-shadow pattern representative of the image to be recorded. Image quality is poor because charges of the same polarity tend to repel one another, causing areas of uniform shade to have a sparse concentration of charge. When the electrostatically attractable toner is deposited to effectuate a "light-dark" charge pattern, it will not distribute in proportion to the original shade of the image, but rather it will tend to concentrate in the transition regions. The resulting copy will thus be more in the nature of an outline. Contrastingly, in the photographic process, the toner is uniformly distributed on the surface of the recording medium during fabrication. Hence the illuminated areas of the recording medium respond in proportion to the light intensity to produce a true representation.

Albeit the resolution and sensitivity of the photographic method is characteristically much greater than that which can be attained using present day electrostatic techniques, prior art photographic reproduction systems are slow in that considerable time is required to perform the developing and stabilizing steps required for permanent copies. In industrial applications where rapid access to a first copy is of importance, or where a large number of copies are desired, both the initial delay and the time between successive copies may be prohibitive. Accordingly, it is an object of the present invention to provide a high speed photographic and processing apparatus.

Another object of the invention is to provide an apparatus which will perform the necessary steps for permanent hard copy reproduction at a rate which is independent of the speed at which information is generated or supplied.

A further object of the invention is to provide a recording and processing device capable of producing permanent copies from low intensity visual information.

These and other objects and advantages of the invention will become obvious from the description of a particular embodiment.

Summary of invention

The photographic recorder and processor of this invention automatically records transient and permanent visual data on high speed photosensitive oscillograph paper and produces therefrom standard page size photographic copies. The oscillograph paper is stored on a magazine reel which may be rotated to supply paper according to the rate at which frames of visual information are presented. The length of paper undergoing exposure is held stationary against the surface of a vacuum platen until recordation is complete, at which time the exposed frame is rapidly advanced so as to bring a new length of paper into readiness for exposure. A vacuum buffer column having a capacity of at least one frame length is utilized to isolate this movement of paper from the magazine reel, leaving the latter to follow at a slower speed dictated by its own inertia. After advancement, the exposed frame is seized by a vacuum slip conveyor and severed by a guillotine mechanism. The severed frame is transferred from the vacuum slip conveyor to a springband conveyor by air pressure, whereupon it is seized at its outermost extremities and transported through the various processing steps at a speed which is independent of the time required for subsequent exposures.

The processing of each print involves several steps. After capture by the springband conveyor, the individual frames are transported to the developing station where a heated developing solution is applied to the print surface. This is accomplished by passing the frame between a set of resilient application rollers, one of which is partly submerged in a level controlled bath so that it may pick up and deposit solution on the print as the print is translated along its course; the excess developer being returned to the bath as the roller revolves. After deposition of the developer, the prints are passed over a high temperature rotatably mounted developer drum. An internal vacuum is utilized to hold the wet print against the drum surface which is constructed of a semiporous wire cloth.

The print is next passed via the conveyor bands to stabilizing baths where stabilizing solutions are applied in an analogous manner to that described for application of the developing solution. After deposition of the stabilizing fluid, the prints are passed over an externally heated rotatably mounted drying drum having an internal vacuum and porous surface of similar construction to that previously described for the developing drum. External heat is supplied to the drying drum and reflectors so as to optimize the radiant energy transmitted to the drum and print. Sensing indicators provide the necessary signals for controlling the lamp intensity to prevent overheating of the drying drum when no prints are being processed.

Modification of the pitch of the springbelt conveyor bands is utilized to compensate for the transverse expansion and shrinking which naturally results from the wetting, heating and drying that accompanies the processing of the prints. Longitudinal dimensional changes are compensated for by driving various sections of the springband conveyor at different speeds. The original width of each print is purposely larger than the final copy so that the outermost edges which have been trapped between the springbands of the conveyor may be trimmed off. This operation occurs after the prints leave the drying drum whereupon they are passed to another rotatably mounted drum to which they cling as the outermost edges are sliced off by rotary cutting wheels running in contact grooves in the drum surface. The finished prints are removed from the drum and deposited in a place of access by a transfer conveyor.

Detailed description of a particular embodiment

Figure 1:
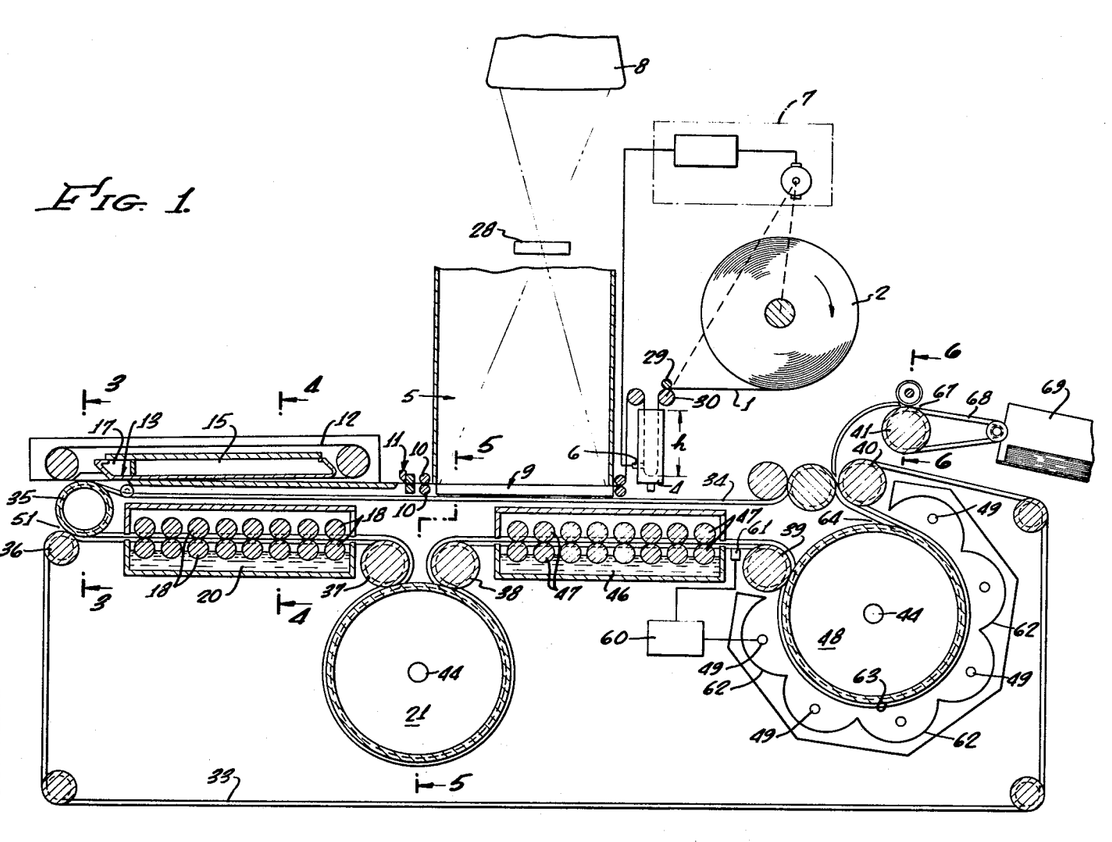
FIGURE 1 represents a preferred positional arrangement of the operative elements of the invention wherein vacuum is supplied to the vacuum drums through hollow axles.

FIGURE 1 illustrates the operative features of the photographic recorder and processor. Recording medium 1 is stored in continuous rolls on a drum magazine 2 which is journaled in bearings so that it can be commanded to rotate in the direction shown. The recording medium is typically a photosensitive oscillograph paper, as for example Kodak Ekatine 18 which is available in standard rolls of 400 and 900 feet having a width of 12 inches. It is understood, however, that any light sensitive photographic material might be used by making changes in dimensional relationships and altering the processing steps. A vacuum buffer column 4 serves to isolate the exposure station 5 from the inertia of the drum magazine so that recording medium may be supplied and withdrawn from the exposure station 5 at a rate which is independent of the speed at which the drum magazine can be resolved. This is accomplished by sensors 6 in the tape column 4 which provide appropriate control signals to a servo mechanism 7. The servo mechanism 7 operates to drive the drum magazine 2 and the pinch rollers 29 and 30 so as to maintain a constant height $h$ of recording medium in the vacuum column. As shown, the exposure station includes a cathode ray tube 8 and lens systems 28 for focusing visual information on the photosensitive paper 1. In practice, the cathode ray tube 8 is connected to a suitable electronic circuit, not shown or described since the specific details of the light source form no part of the instant invention, it being apparent that other types of exposure mechanisms, such as a reflecting or projecting system, could be used with equal facility.

Figure 2:
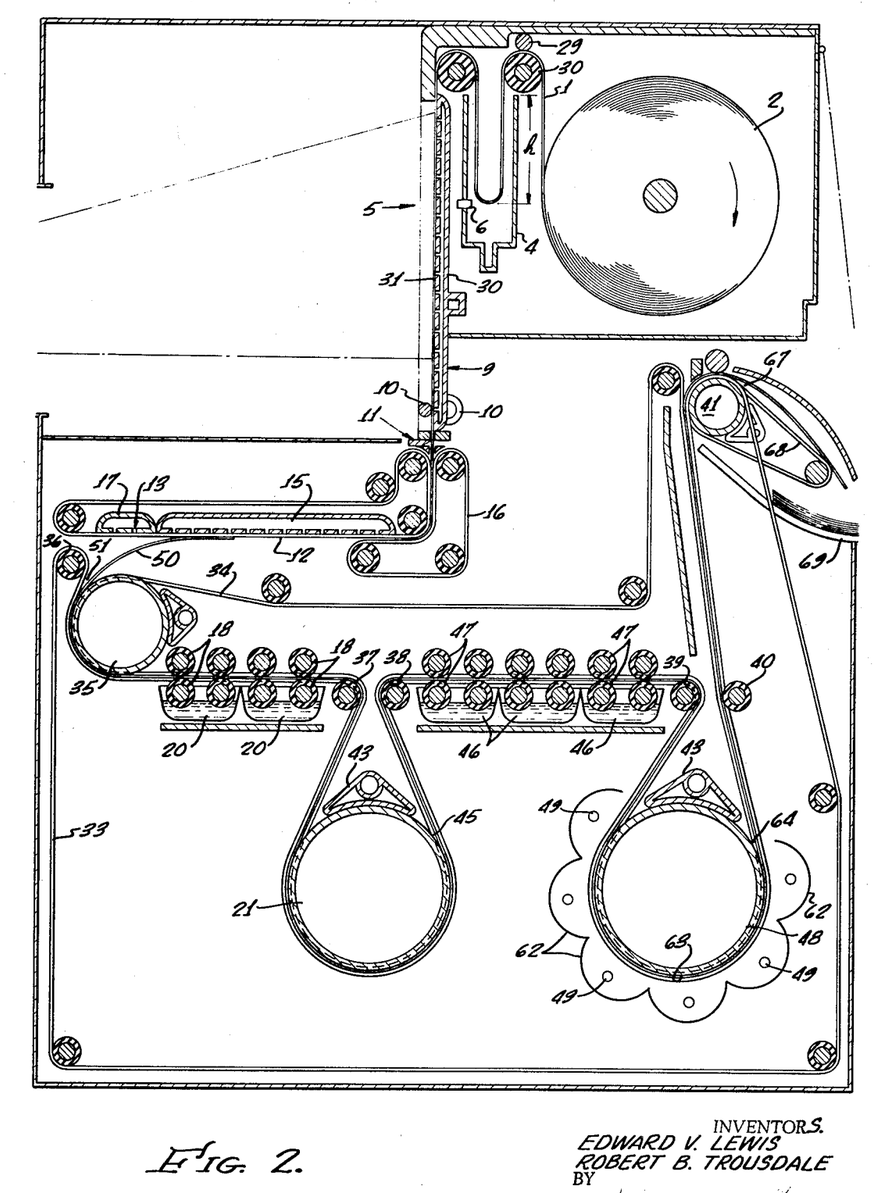
FIGURE 2 represents an alternative placement of the elements showning greater detail in the operation of the vacuum platen and the introduction of vacuum to the vacuum drums through contiguous manifolds.

FIGURE 2 illustrates an alternative arrangement of the operative parts and shows in greater detail the construction of the vacuum platen 9 of FIGURE 1 for holding recording medium stationary during the recording period. The vacuum platen comprises a manifold 30 having an opening which is covered with a permeable cloth 31. A partial vacuum within the manifold causes recording medium 1 to adhere to and spread uniformly over the surface formed by the permeable cloth 31. The permeable cloth is typically a woven wire or other high durability material having sufficient porosity to pass air therethrough.

Figure 3:
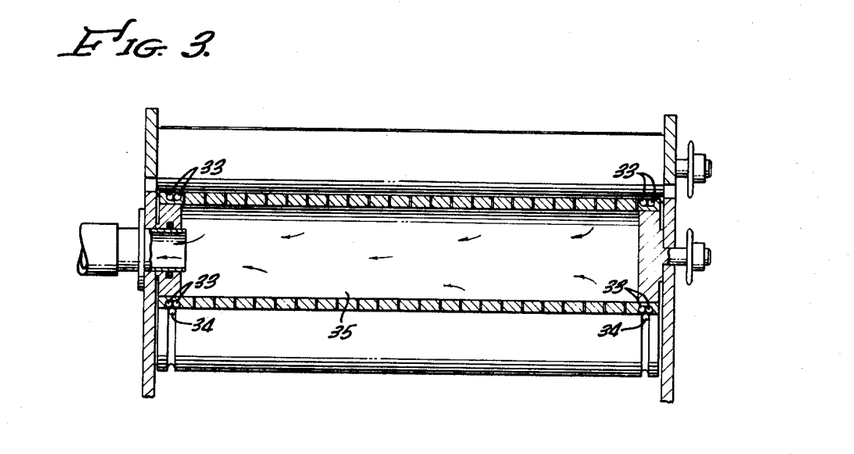
FIGURE 3 is a cross sectional view of a portion of FIG. 1 illustrating the relationship of the springbands as they come together to grip the severed spans.

A signal indicating the completion of the recording process causes the exposed frame to be rapidly extracted from the exposure station by capstan metering rollers 10 which rotate a predetermined number of revolutions to bring the next successive frame from the vacuum column 4 to the vacuum platen 9 in readiness for exposure. As each recording is completed and extracted from the exposure station 5 the servo amplifier 7 in response to the sensor 6 signals causes the drum magazine 2 to revolve, thus restoring the original height $h$ of the recording medium in the vacuum column 4. The recorded frame which is extracted from the exposure station 5 by the metering roller 10 is severed by a guillotine mechanism 11. A vacuum conveyor 12 transports the severed span 50 to the "blow-off" port 13 which, by virtue of positive pressure, operates to transfer the severed span from the vacuum conveyor 12 to a springband conveyor 33–34. FIG. 2 indicates how the leading edge of the severed span 50 is trapped at its outer edges by the springbands 33 and 34 as they come together at 51. This feature is also illustrated in FIG. 3, which shows a cross sectional view of that part of FIG. 1 illustrating the relationship of the springbands as they join together on the drum 35.

The exact manner in which the exposed frame is rapidly extracting from the exposure station and transferred to the springband conveyor 33–34 may be seen by referring again to FIGURE 1. As the capstan metering rollers 10 advance the recording medium 1 to extract the recorded frame from the exposure station 5, the leading edge is pulled into sliding contact with the vacuum conveyor 12 which is traveling at a linear speed comparable to that at which the recording medium is being advanced. Identical speed between conveyor and recording medium is not necessary since the recording medium may freely slide with respect to the conveyor belt when restrained by the capstan metering rollers—a situation occurring while the exposed frame is severed by the guillotine 11.

Figure 7:
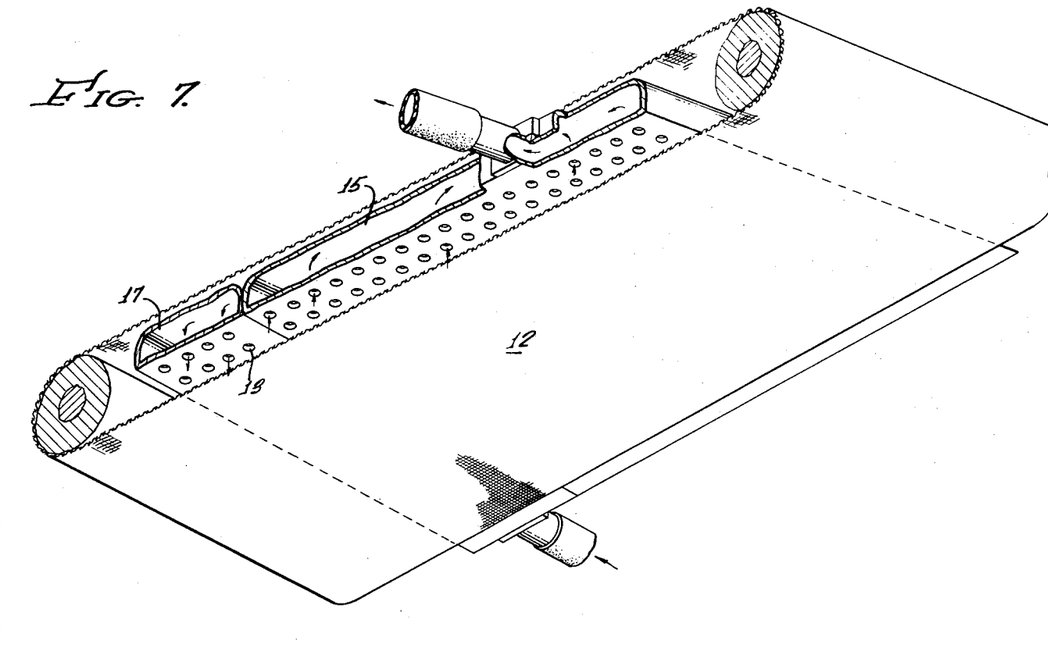
FIGURE 7 illustrates the construction of the vacuum conveyor.

The construction of the vacuum conveyor is illustrated in FIG. 7. It is comprised of a manifold 15 having an opening over which runs a continuous semiporous conveyor belt 12. The conveyor belt 12 is typically a woven wire cloth or other semipermeable material having sufficient porosity such that the recording medium will be attracted to the traveling surface when a vacuum is created within the manifold. After the frame is severed, it is transported across the vacuum manifold 15 by the porous conveyor 12 until the "blow-off" port 13 is reached. As positive pressure within the "blow-off" manifold 17 repels the exposed frame from the porous belt whereupon it is transferred to the spring belts 33–34 which continue to transport the frame for processing at a speed which is independent of the time required for subsequent exposures at the exposure station. The only significant difference between the positional arrangement shown in FIGS. 1 and 2 lies in the auxiliary conveyor 16 shown in FIG. 2 for directing the severed span to the vacuum conveyor 12.

Figure 4:
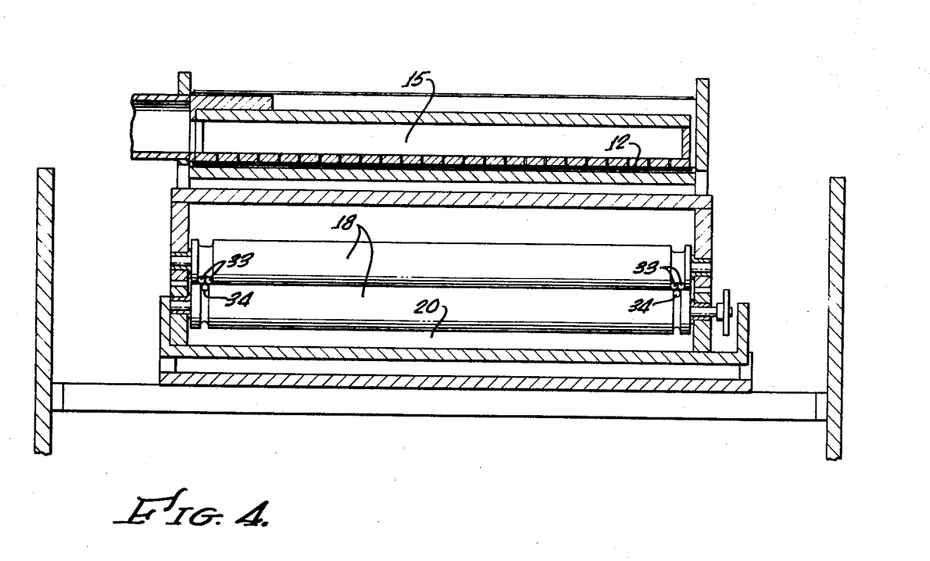
FIGURE 4 is a cross sectional view of a portion of FIG. 1 illustrating the drying drum and vacuum conveyor.
Figure 8:
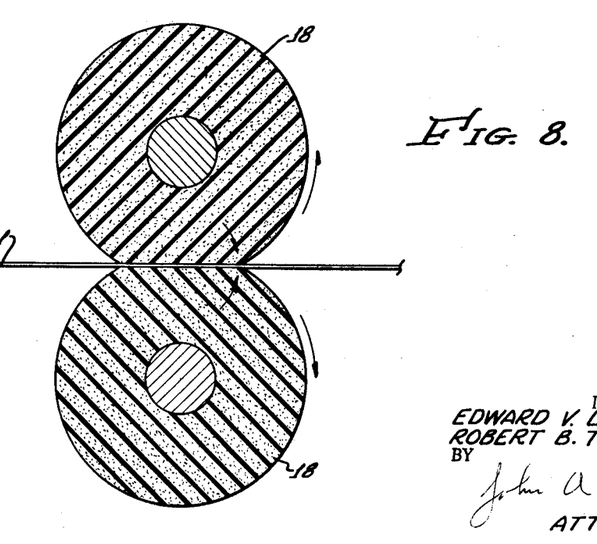
FIGURE 8 illustrates the operation of the elastically deformable application rollers.

Referring again to FIG. 1, the severed frame is transported to a set of application rollers 18 where a heated developing solution is applied to the surface of each print as it is passed between the rollers. The lower roller rotates in the bath of solution 20 which has both its temperature and level controlled. Being partly submerged, the roller picks up and deposits solution on the print as it comes into contact with the roller, the excess solution being returned to the bath 20 as the roller continues to revolve after the frame has passed by. To prevent the wet prints from sticking to the application rollers, they are constructed of a resilient material which acts naturally to spring the leading edge of each span from the roller surface as it emerges. The relationship between the rollers and print during the springing action is detailed in FIG. 8. A cross sectional view of the rollers is shown in FIG. 4.

Figure 9A:
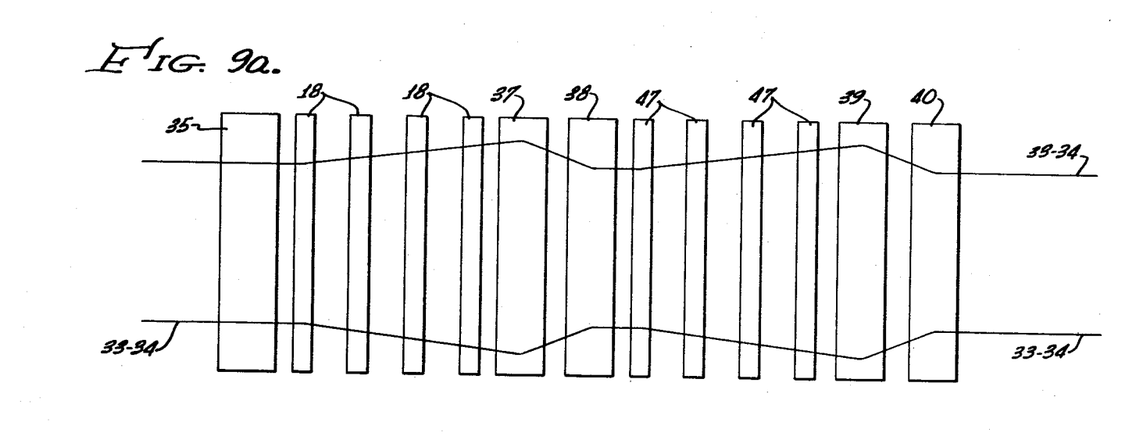
FIGURE 9a illustrates how the pitch of the springband conveyor is varied to accommodate for transverse dimensional changes.
Figure 9B:
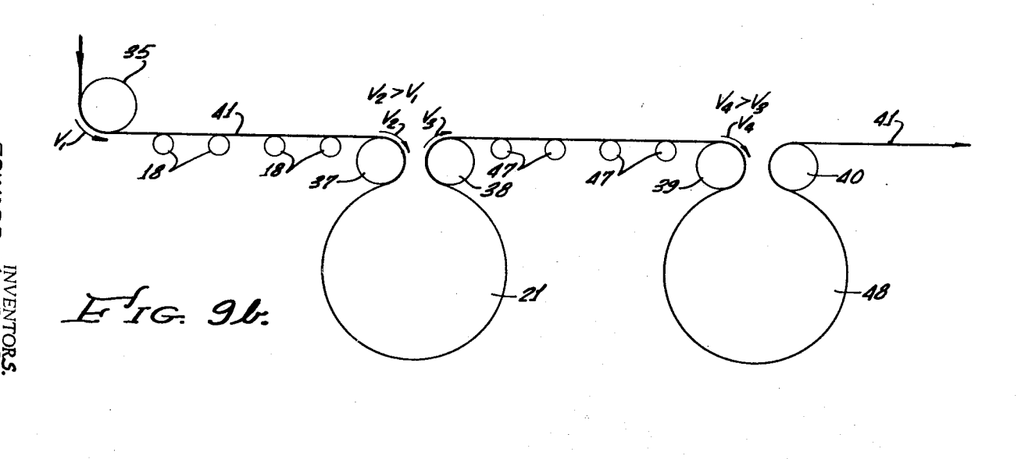
FIGURE 9b illustrates how various sections of the springband conveyor is driven at different speeds to accommodate for longitudinal dimensional changes.

FIG. 9a illustrates how the pitch of the conveyor is changed to accommodate for transverse stretching and shrinking of the print as it is subjected to the various heating, wetting and drying steps involved in processing. By thus varying the distance between the springheads, buckling and wrinkling of the prints is avoided even though the print undergoes dimensional changes during processing. Similarly, the longitudinal changes in dimension may be accommodated by driving various sections of the springband conveyor at different speeds. FIG. 9b indicates how this may be accomplished by driving the roller 37 at a speed $V_2$ which is greater than the speed $V_1$ of roller 35. Similarly, the speed $V_4$ of roller 39 is greater than the speed $V_3$ of roller 38.

Figure 5:
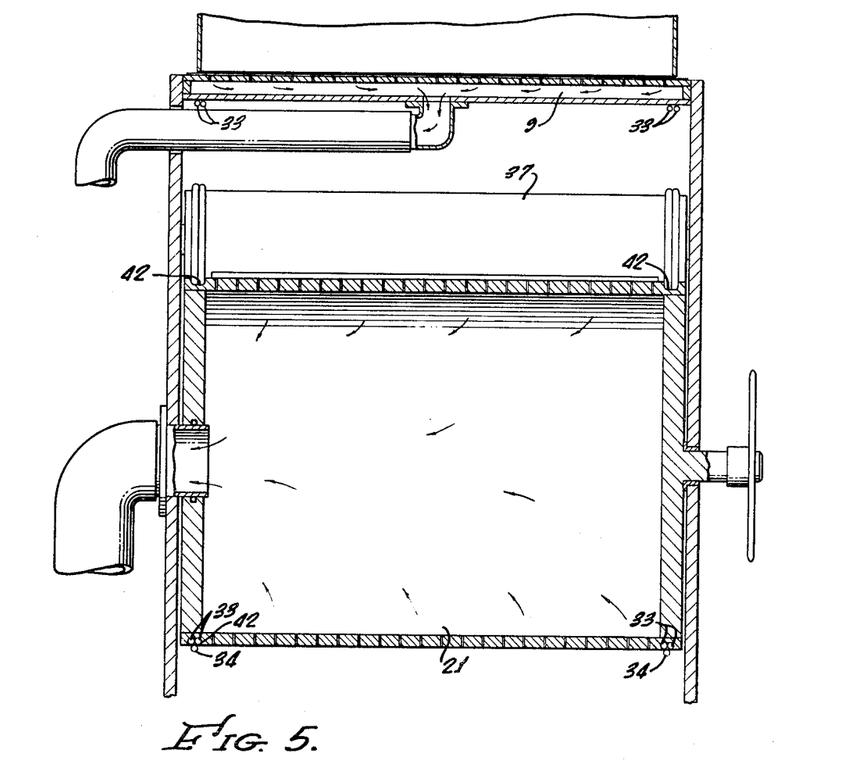
FIGURE 5 is a cross sectional view illustrating how air may be supplied to the vacuum drum via a hollow axle.

Referring again to FIG. 1, the application of the developer solution is followed by applying heat to the wetted prints to accelerate the developing process. This is accomplished by carrying the wet prints into contact with the surface of a heated developer drum 21 which is driven at an angular velocity such that its surface speed is commensurate with the velocity of the springbands 33–34. As shown in FIG. 5, the springbands ride in grooves 42 on the drum surface near its outer edges thus allowing the wet print to spread uniformly over the drum surface to facilitate drying. The drum is maintained at an elevated temperature by internal heaters to which electricity is supplied via slip rings which are not shown since they form no part of the present invention. The drum surface is constructed of a semiporous woven wire cloth (similar to that utilized in the vacuum conveyor 12) to which the wet prints cling upon application of an internal vacuum. The vacuum may be supplied by either a manifold mechanism 43 as shown in FIG. 2, or it may be supplied via a hollow axle 44, as shown in FIG. 5. In either case, the effect is the same, i.e., that of causing the wet print to adhere to the heated drum. Furthermore, the adhesion produced by the differential pressure results in an even spreading of the print over the drum surface thereby effecting efficient heat transfer between the two surfaces thus accelerating the developing time.

As shown in FIG. 2, the conveyor bands 33 and 34 act to separate the print from the surface of the developer drum at the point 45 where they part contact with the drum. The print, being still secured between the springbands, is transported to the stabilizing baths 46 (or fixing baths, depending upon the type of processing) where solution is applied by resilient application rollers 47 in the same manner as the developer solution was applied. The pitch and speed of the springbands is again varied as shown in FIGS. 9a and 9b to account for stretching and shrinking during the stabilizing (or fixing) process.

Figure 10:
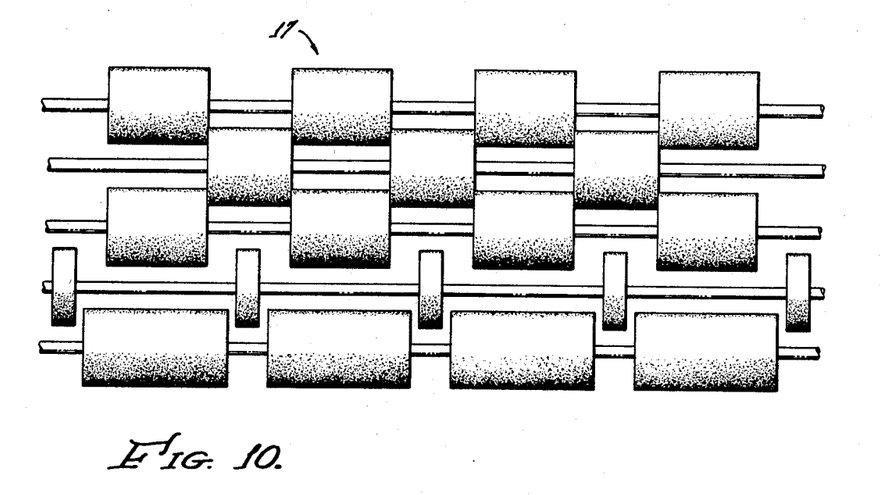
FIGURE 10 illustrates a set of interlocking rollers.

As an alternative to using resilient rollers for applying the developing and stabilizing solutions, interlocking sets of rollers may be used to the same effect, i.e., that of preventing the wetter print from wrapping around the roller. FIG. 10 illustrates an interlocking roller assembly.

After application of the stabilizing solution, the wet print is passed to an externally heated drying drum 48. The drying drum is driven in an analogous manner to that described previously for the developer drum. The drying drum is constructed similar to the developer drum—having a surface of woven wire or other semiporous material through which the effects of an internal vacuum supplied by either a hollow axle 44 as shown in FIG. 1 or a manifold 43 as shown in FIG. 2 may be transmitted. Heat is supplied by external infrared heaters 49, their function being to concentrate a large dose of thermal radiation on the print while it is revolving with the drum. FIG. 1 illustrates an intensity control circuit 60 for varying the power applied to lamps in response to a signal from a sensing switch 61 which indicates the presence of a print. When a print is detected the intensity control circuitry 60 supplies maximum power in order to minimize drying time, whereas the absence of a print causes the lamp intensity to be reduced to a low level "standby mode" in order to prevent overheating. Increasing the intensity while drying, even though prints are closely spaced along the springband conveyor, does not cause overheating because most of the thermal energy is absorbed in evaporating the wet solution. The intensity control circuitry 60 is typically an electronically actuated switch, and the sensing switch 61 may be either a mechanical type (such as a microswitch or equivalent) or an electrical sensor (such as a light and photocell or its equivalent).

Figure 11:
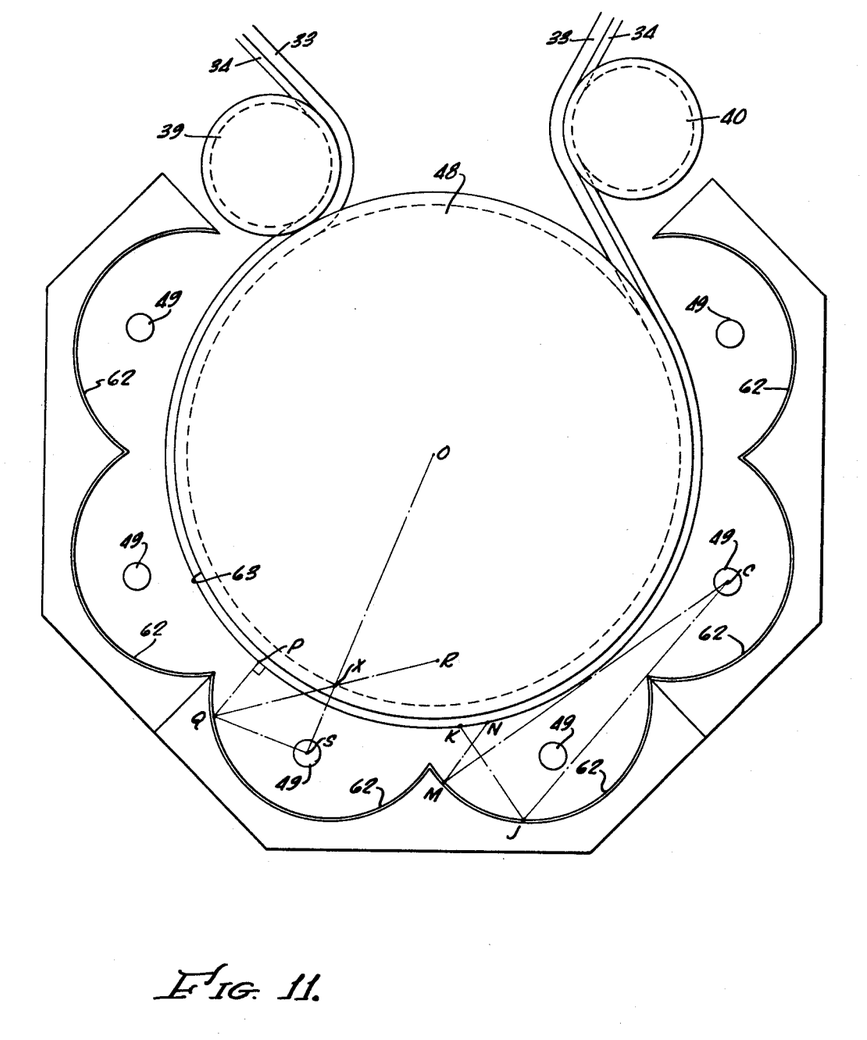
FIGURE 11 illustrates the dimensional relationship between the reflectors, heat source, and drum size.

FIGURE 11 shows an enlarged view of the infrared lamps 49 as small circles which represent the end view of cylindrical tubes having a length equal to the width of the drying drum. Associated with each lamp is a reflector 62 for concentrating the thermal energy of the lamp 49 in the direction of the drum 48. The infrared lamps 49 and their associated reflectors 62 are dimensionally sized and spatially arranged with respect to the drying drum 48 to effectuate an efficient thermal transfer. In the particular embodiment illustrated in FIG. 11, six infrared lamps 49 and their associated reflectors 62 are equally spaced over approximately 210° of drum circumference. Each lamp is located at a distance midway between the drum surface 63 and the circular reflector 62, the latter having a radius such that the reflected thermal energy will strike the drum normal to its surface rather than obliquely so as to minimize unwanted secondary reflection from the drum surface.

Once the size of drum and position of lamps and reflectors is established, optimum radius for the individual reflectors can be approximated by constructing a perpendicular to the drum surface at a point P which will intersect a reflector at a point Q near its outermost confines. If a line from the center of the light source S to the point Q is drawn, the angle so formed SQP may be bisected to form a line QR normal to the surface of a reflector having an optimum radius. This results from the well-known law of optics wherein a plane wave is reflected from a plane surface with the angle of reflection equal to the angle of incidence. The bisected angle represented by the line QR is thus normal to circular arc which will direct incident energy from the lamps to strike the drum surface perpendicularly or nearly perpendicularly depending upon the location of the point Q. The desired radius is determined by the intersection X of the line QR with a line SO constructed between the lamps center S and the drum center O.

It may also be observed that, by utilizing a number of equally spaced reflectors about the drum, energy rays which miss one reflector will nevertheless be directed from another reflector to the drum surface. The significance of obviating multiple reflections lies in the fact that in every reflection, only a part of the incident energy is reflected, while the remainder is absorbed in pernicious heating of the reflecting surface. That the reflective paths from a lamp C to the drum surface involve only one reflection is illustrated by the rays CJK and CMN, each of which after missing the first reflector is directed to the drum surface by a second reflector according to the aforementioned familiar equality between the angle of incident and reflected rays.

Figure 6:
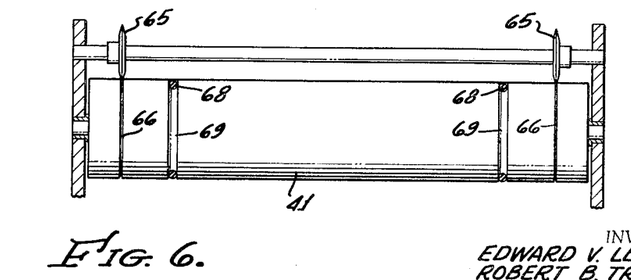
FIGURE 6 illustrates the operation of the sizing roller.

Referring again to FIG. 2, it may be seen that the prints revolve with the drying drum 48 until they are separated from it by the springbands at 64. FIGURE 6 shows how the edges of the fully processed prints are next sheared off by the rotary cutters 65 which travel in grooves 66 on the surface of the sizing roller 41 which is motivated to turn in accordance with the springbands 33–34 in the same manner as the heating and drying drums. The purpose of trimming is to remove that portion of the print which is crushed and wrinkled by the springbands as it is carried through processing. Using 12" wide stock, an 8½" frame length will result in a standard size 8½" x 11" print when ½" is trimmed from each edge of the processed copy.

Adverting again to FIG. 2, it may be seen that the trimmed prints are separated from the grooved roller at the point 67. The purpose of the inner springbands 68 which ride in the O-ring slots 69 (as shown in FIG. 6) inside the cutting grooves 66 is to provide a means for removing the processed print from the sizing roller 41 after the rotary cutter 65 has separated the print from the primary conveyor springbands 33–34. In FIG. 1, the free prints are parted from the sizing roller at the point 67 whereupon the inner springbands 68 act as an output conveyor to deliver the separated prints to an output chute 69 through which they freely fall to a point of access by the human operator.

It is to be understood that the present invention is not limited in its application to the hard copy reproduction of cathode ray displayed data, but may be utilized to photographically record any visually displayed information. Typical examples include printed material, micro films, and industrial photography.

Although a preferred embodiment of the present invention has been shown and described herein, it is understood that the invention is not limited thereto and numerous changes and substitutions may be made without departing from the spirit of the invention.

We claim:

1. A photographic recording and processing apparatus comprising: a supply magazine for storing rolls of recording medium; an exposure station adapted to record single frames of visual information on said recording medium; buffer means for isolating said supply magazine from said exposure station whereby movement of said recording medium at said exposure station is independent of said supply magazine; a sensor means for indicating the quantity of recording medium stored by said buffer means; actuating means responsive to said sensor for advancing said magazine to supply said recording medium to said buffer so as to maintain a constant supply of recording medium in said buffer; measuring and cutting means for severing each exposed frame from the unexposed recording medium; a process conveyor means adapted to receive and transport severed lengths of recording medium for processing; means for transferring severed lengths of said recording medium to said process conveyor after separation from the unexposed recording medium.

2. The apparatus claimed in claim 1 wherein the recording medium is light sensitive oscillograph paper.

3. The apparatus claimed in claim 1 wherein said supply magazine comprises a rotatably mounted cylindrical drum for storing recording medium in a swathe about said drum whereby recording medium so stored may be unwound as the drum is rotated by said actuating means.

4. The apparatus claimed in claim 1 wherein said exposure station comprises: a vacuum platen for holding recording medium stationary during exposure; a capstan and pinch roller drive for moving recording medium with respect to said vacuum platen; a lens system for focusing visual data on recording medium held stationary by said vacuum platen.

5. The apparatus claimed in claim 1 wherein said buffer means comprises a vacuum column having a capacity of at least one frame length.

6. The apparatus claimed in claim 1 wherein said measuring and cutting means comprises: a metering roller and capstan drive assembly for advancing recording medium a predetermined distance after exposure; a guillotine for severing the length of recording medium so advanced.

7. The apparatus claimed in claim 1 wherein said means for transferring severed lengths of recording medium to said process conveyor comprises: a porous moving surface for receiving severed lengths of recording medium; a vacuum manifold having a port contiguous with said moving surface; means for creating a partial vacuum in said manifold so that received lengths of recording medium will adhere to said porous moving surface as a consequence of the vacuum; a pressure manifold having a port contiguous with said moving surface; means for creating a positive pressure in said pressure manifold so that lengths of recording medium will be separated from said porous moving surface as a consequence of the positive pressure.

8. A photographic recording and processing apparatus comprising: a supply magazine for storing rolls of recording medium; an exposure station adapted to record single frames of visual information on recording medium supplied by said magazine; buffer means for isolating said supply magazine from said exposure station whereby movement of recording medium at said exposure station is independent of said supply magazine; sensor means for indicating the quantity of recording medium stored in said buffer means; a servo means responsive to said sensor means for advancing said supply magazine so as to replenish the supply of recording medium stored in said buffer means as it is withdrawn for exposure; means for cutting recording medium into spans having a length commensurate with the exposure frames; a process conveyor means adapted to receive frame lengths of recording medium and retain the frames so received by their extremities for transporting and processing; means for transferring severed spans of recording medium to said process conveyor; means for processing the severed frames transported on said process conveyor; means for separating and removing frames from said process conveyor after processing.

9. The apparatus claimed in claim 8 wherein the recording medium is light sensitive oscillograph paper.

10. The apparatus claimed in claim 8 wherein said means for transferring the exposed severed spans of recording medium to said process conveyor means comprises: a porous moving surface adjoining said process conveyor; drive rollers for bringing one end of a span into sliding contact with said porous moving surface; a stationary vacuum manifold having a port contiguous with said porous moving surface and adjacent to the area where spans contact said porous moving surface; means for creating a partial vacuum in said vacuum manifold so as to cause received spans to cling to said porous moving surface; a stationary positive pressure manifold having a port contiguous with said moving surface, said pressure port being spaced with respect to said vacuum port in the direction of motion of said porous moving surface; means for creating a positive pressure in said pressure manifold whereby clinging spans may be diverted from said porous moving surface to said adjoining process conveyor.

11. The apparatus claimed in claim 8 wherein said process conveyor means comprises: an endless elastic conveyor for engaging the extremities of deposited spans of recording medium so that deposited spans may be transported for processing.

12. The process conveyor claimed in claim 11 wherein said endless elastic conveyor comprises: a pair of parallel double springbands spaced to contact the extremities of deposited spans of recording medium at the point of deposition; single springbands contiguous with, and running in tangential contact with each pair of parallel double springbands from the point where spans are deposited whereby the extremities of deposited spans are trapped between said double springbands and said single springbands for transportation.

13. The process conveyor claimed in claim 11 wherein the width of said elastic conveyor is varied so as to accommodate for transverse dimensional changes in spans undergoing processing.

14. The process conveyor claimed in claim 12 wherein the separation between each group of springbands is varied so as to accommodate for transverse dimensional changes in spans undergoing processing.

15. The process conveyor claimed in claim 11 wherein one or more portions of said endless elastic conveyor are driven at different speeds than other portions so as to accommodate for longitudinal dimensional changes in spans undergoing processing.

16. The process conveyor claimed in claim 12 wherein the linear speed of said springbands are varied from point to point so as to accommodate for longitudinal dimensional changes in spans undergoing processing.

17. The apparatus claimed in claim 8 wherein said means for processing the severed frames transported on said process conveyor comprises: means for applying processing solutions to frames transported on said process conveyor; heating means adjacent to the path of said process conveyor for accelerating the processing time; heating means adjacent to the path of said process conveyor for accelerating the drying time.

18. The apparatus claimed in claim 17 wherein said means for applying processing solutions to frames transported by said process conveyor comprises: a level controlled bath for holding a processing liquid; at least one pair of rotatably mounted application rollers positioned to sandwich said process conveyor with one roller partially submerged in said bath, said rollers to be in pressure contact with each other; means for rotating said rollers at a speed commensurate with the linear velocity of said process conveyor whereby frames transported by said process conveyor will be wetted as they are squeezed between said pair of application rollers.

19. The apparatus claimed in claim 18 wherein said application rollers are resilient so as to cause the wetted frames to be sprung free of said rollers as they emerge.

20. The apparatus claimed in claim 17 wherein said heating means for accelerating the processing time comprises: a rotatably mounted drum having a portion of its circumference contiguous with said process conveyor, said drum having a circumferential surface of sufficient porosity to pass air therethrough; heating means for elevating the surface temperature of said drum; means for rotating said drum at a speed commensurate with the linear velocity of said process conveyor; means for creating a vacuum inside said drum whereby frames transported on said process conveyor are caused to cling to the heated circumferential surface of said drum and revolve therewith over that part of a revolution in which said process conveyor and said drum are in contact.

21. The apparatus claimed in claim 17 wherein said heating means for accelerating the drying process comprises: a rotatably mounted drum having a portion of its circumference contiguous with said process conveyor, said drum having a circumferential surface of sufficient porosity to pass air therethrough; means for rotating said drum at a speed commensurate with the linear velocity of said process conveyor; means for creating a vacuum inside said drum whereby frames transported on said process conveyor are caused to cling to the circumferential surface of said drum; a plurality of infrared heaters spatially displaced about the circumference of said drum; a curved reflecting surface associated with each of said infrared heaters and spatially arranged to reflect the energy emitted therefrom in a direction normal to the circumferential surface of said drum; means responsive to the presence of a frame for increasing the intensity of said infrared heaters so as to supply maximum energy for drying a frame while it is in contact with the surface of said drum.

22. The apparatus claimed in claim 8 wherein said means of separating and removing frames from said process conveyor comprises: cutting means for severing the extremities of frames so retained by said process conveyor; an output conveyor for transporting the separated frames to a place of access; means for transferring frames separated from said process conveyor to said output conveyor.

23. The apparatus claimed in claim 8 wherein said means of separating frames from said process conveyor comprises: a rotatably mounted drum positioned to have a portion of its circumferential surface contiguous with said process conveyor, said drum having an outer pair of annular grooves separated by a distance less than the width of frames transported by said process conveyor and a plurality of inner "O" ring slots; means for rotating said drum at a speed commensurate with said process conveyor; a rotary cutting wheel associated with each of said outer grooves and positionally aligned for rotary contact therewith whereby transported frames retained at their extremities may be severed therefrom; conveyor bands riding in said inner O ring slots for removing severed frames from said drum to a place of access.

24. The apparatus claimed in claim 8 wherein said exposure station comprises: a vacuum platen for holding recording medium stationary during exposure; means for moving recording medium with respect to said vacuum platen; means for presenting visual data to recording medium held stationary by said vacuum platens.

25. The apparatus claimed in claim 24 wherein said vacuum platen comprises: a porous surface; a vacuum manifold having an opening contiguous with one side of said porous surface; means for creating a partial vacuum within said vacuum manifold so as to cause recording medium to spread evenly over the other side of said porous surface.

References Cited

UNITED STATES PATENTS

| | | | |
|---|---|---|---|
| 2,333,768 | 11/1943 | Davies et al. | 95—12.5 |
| 2,553,014 | 5/1951 | Singer | 95—14 |
| 2,895,706 | 7/1959 | Blatherwick | 355—73 |
| 2,927,503 | 3/1960 | Zollinger | 95—94 |
| 3,295,427 | 1/1967 | Oswald | 95—14 |
| 3,315,583 | 4/1967 | Hunt | 95—94 |
| 3,362,079 | 1/1968 | Fleissner | 34—115 |
| 3,364,816 | 1/1968 | Jeffree | 355—73 |
| 3,398,664 | 8/1968 | Bonatsos | 95—14 |
| 3,408,141 | 10/1968 | Grant | 355—28 |
| 3,425,777 | 2/1969 | White | 355—28 |
| 3,440,944 | 4/1969 | Endermann et al. | 95—89 |

FOREIGN PATENTS 850,640  10/1960  Great Britain.

NORTON ANSHER, Primary Examiner

R. M. SHEER, Assistant Examiner

U.S. Cl. X.R.

34—123, 158; 95—94; 355—28, 73